United States Patent [19]

Beck

[11] 4,076,910

[45] Feb. 28, 1978

[54] NUCLEATION OF ISOTACTIC POLYSTYRENE

[75] Inventor: Henry Nelson Beck, Walnut Creek, Calif.

[73] Assignee: The Dow Chemical Company, Midland, Mich.

[21] Appl. No.: 453,465

[22] Filed: Mar. 21, 1974

Related U.S. Application Data

[62] Division of Ser. No. 293,823, Oct. 2, 1972, Pat. No. 3,817,966.

[51] Int. Cl.$^2$ .............................................. C08K 5/34
[52] U.S. Cl. ....................................................... 526/6
[58] Field of Search ................. 260/93.5 A, 45.8 NT; 526/6

[56] References Cited

U.S. PATENT DOCUMENTS

| | | | |
|---|---|---|---|
| 3,207,739 | 9/1965 | Wales | 260/93.5 |
| 3,367,926 | 2/1968 | Voeks | 260/93.5 |
| 3,563,971 | 2/1971 | Wood et al. | 260/94.9 |
| 3,714,114 | 1/1973 | Stretanski | 260/45.8 NT |
| 3,769,269 | 10/1973 | Beck | 260/91.7 |

FOREIGN PATENT DOCUMENTS 748,476  12/1966  United Kingdom .......... 260/93.5 A

Primary Examiner—Paul R. Michl
Attorney, Agent, or Firm—R. B. Ingraham

[57] ABSTRACT

Isotactic polystyrene is heat fabricated in admixture with minor proportions of melamine, thymine, 2-hydroxybenzimidazole, oxamide and numerous other compounds to provide improved crystallization rates.

3 Claims, No Drawings

NUCLEATION OF ISOTACTIC POLYSTYRENE

This is a division of application Ser. No. 293,823 filed Oct. 2, 1972 now U.S. Pat. No. 3,817,966.

The present invention is concerned with isotactic polystyrene. Isotactic polystyrene has many desirable physical properties. However, the fabrication of such articles has not generally been economically feasible because of the extended period of time required for the isotactic polystyrene to become crystalline. For example, in injection molding of atactic polystyrene or amorphous polystyrene, relatively short mold cycles are obtained which, for many articles, are in the range of seconds. However, if isotactic polystyrene is employed in a similar process a much longer period of time will elapse before the article can be safely removed from the mole in the crystalline form. The problems of crystallization of isotactic polymers are well known in the art; for example, U.S. Pat. No. 3,367,962 discloses a large variety of compounds which are useful as nucleating agents in a variety of thermoplastic crystalline polymers including isotactic polystyrene. (The teaching of this patent is herewith incorporated by reference thereto). The heat distortion temperature of crystalline isotactic polystyrene is usually about 190° C. to 200° C., while the heat distortion temperature of amorphous isotactic or atactic polystyrene is generally within the range of from 90° C. to 100° C. With isotactic polystyrene the maximum rate of crystallization is generally attained at about 175° C. Usually a molded or other shaped article of amorphous isotactic polystyrene generally deforms to an undesirable degree when annealing is carried out without the support of a mold by heating the shaped article at a temperature of 175° C. to promote crystallization. If the crystallization rate is slow and an amorphous isotactic polystyrene article must be retained in a mold in order to induce crystallization without undesired distortion of the molded part, long and expensive mold cycles result.

It would be desirable to have available a means to increase the crystallization rate of isotactic polystyrene sufficiently that at least a sufficient degree of crystallization could rapidly be obtained in a mold so that further annealing to complete crystallization could be accomplished external to the mold without undesirable deformation of the article.

It would further be desirable if there were available an improved isotactic polystyrene composition with an improved or increased crystallization rate.

It would also be desirable if there were available an improved method of molding isotactic polystyrene.

These benefits and other advantages in accordance with the present invention are achieved in an isotactic polystyrene composition, the composition comprising in intimate admixture from about 99.995 to about 95 parts by weight of isotactic polystyrene and from about 0.005 to about 5 parts by weight of a compound selected from the group set forth in Table I, and mixtures thereof.

Also contemplated within the scope of the present invention is a method for the heat fabrication of isotactic polystyrene, the steps of the method comprising providing from about 99.995 to about 95 parts by weight of heat plastified isotactic polystyrene in intimate admixture with from about 0.005 part by weight to about 5 parts by weight of a compound selected from Table I, and mixtures thereof, shaping and cooling the mixture of isotactic polystyrene and nucleating agent to a temperature below the heat plastification temperature thereof and recovering a crystalline isotactic polystyrene article.

Nucleating agents useful in the practice of the present invention are set forth in Table I below. Each of the compounds in Table I is identified by numerals in parenthesis. Such designation will hereinafter be employed to identify the compounds.

TABLE I

| | |
|---|---|
| (1) | melamine |
| (2) | 3,6-dihydroxypyridazine (maleic acid hydrazide) |
| (3) | 2,5-pyridine dicarboxylic acid |
| (4) | thymine (5-methyluracil) |
| (5) | 2,4,6-triaminopyrimidine |
| (6) | 2-imidazolidinethione (ethylenethiourea) |
| (7) | 2-hydroxybenzimidazole |
| (8) | 4,5-diaminopyrimidine |
| (9) | 6,7-dimethyllumazine (6,7-dimethyl-2,4-pteridinediol) |
| (10) | 3-cyano-4,6-dimethyl-2-hydroxypyridine |
| (11) | oxamide |
| (12) | 3,4,5,6-tetrahydro-2-pyrimidinethiol |
| (13) | 4-nitroimidazole |
| (14) | theobromine (3,7-dimethylxanthine) |
| (15) | 4,6-diamino-5-nitropyrimidine |
| (16) | 4-hydroxy-6,7-dimethylpteridine |
| (17) | 2-amino-5,6-dimethyl-4-pyrimidinol |
| (18) | 6-azauracil (as-triazine-3,5-(2H,4H)-dione) |
| (19) | lumazine (2,4-pteridinediol) |
| (20) | 8-mercaptopurine |
| (21) | 4-methylesculetin (6,7-dihydroxy-4-methylcoumarin) |
| (22) | 2,4-dihydroxy-6-methylpyrimidine (6-methyluracil) |
| (23) | 3,5-pyridinedicarboxylic acid |
| (24) | biguanide sulfate monohydrate |
| (25) | purpurogallin |
| (26) | uracil (2,4(1H,3H)-pyrimidinedione) |
| (27) | phthalazine-1,4,-dione (phthalic acid hydrazide) |
| (28) | 2-thiouracil (4-hydroxy-2-mercaptopyrimidine) |
| (29) | 2-guanidinobenzimidazole |
| (30) | 2-hydroxy-6-methylpyridine-3-carboxylic acid |
| (31) | 4-hydroxy-2-mercaptopteridine |
| (32) | 5,6-diaminoindazole |
| (33) | 5,6-dimethyl-2-trifluoromethylbenzimidazole |
| (34) | adenine (6-aminopurine) |
| (35) | barbituric acid |
| (36) | 6-amino-1,3-dimethyluracil |
| (37) | 4-aminopyrazolo (3,4-d)pyrimidine |
| (38) | 3-indazolinone |
| (39) | trithiocyanuric acid (s-triazine-2,4,6-trithiol) |
| (40) | 2-methyl-5-nitroimidazole |
| (41) | tetrahydro-2-pyrimidone |
| (42) | 2,4,5-trihydroxypyrimidine (isobarbituric acid) |
| (43) | 2,3-pyridinedicarboxylic acid (quinolinic acid) |
| (44) | quinaldinic acid (quinoline-2-carboxylic acid) |
| (45) | 2-hydroxyquinoline-4-carboxylic acid |
| (46) | cyanuric acid (1,3,5-triazine-2,4,6-triol) |
| (47) | 5,7-dimethyl-1,8-naphthyridin-2-ol |
| (48) | deoxyadenosine hydrate |
| (49) | 1,2-dihydro-3,6-dioxo-1-pyridazine-propionitrile |
| (50) | benzoyleneurea (2,4(1H,3H)-quinazolinedione) |
| (51) | 1H-1,2,4-triazole-3-thiol |
| (52) | 2,5,6-trimethylbenzimidazole |
| (53) | rhodizonic acid dihydrate |
| (54) | pyrido (2,3-β)pyrazine-2,3-diol (2,3-dihydroxy-1,4,5-triazanaphthalene) |

The active nucleation agents can be incorporated in the isotactic polystyrene in effective amounts in a variety of manners. Generally effective amounts are from about 0.005 weight percent to about 5 weight percent, the weight percent being based on the combined weight of the nucleator and the isotactic polystyrene.

In ultimate compositions consisting essentially of the isotactic polystyrene and the nucleator, from about 0.005 to about 1.0 percent by weight of added nucleation agent, based on the isotactic polystyrene, is preferred, depending on other factors as indicated below. In compositions also containing added plasticizers, stabilizers, pigments, fillers, reinforcing agents, mold release agents and the like, a larger proportionate amount of nucleating agent may be required to produce the desired effect.

The particle size of the added nucleating agent is not critical from the standpoint of the qualitative effect on nucleation. In general, small particle size is preferred for ease of obtaining intimate mixing and thorough distribution through the isotactic polystyrene. Usually the smaller the particle size the less nucleator is needed to provide a desired effect on crystallization. However, it is the ultimate particle size which is controlling, rather than the starting size of the material used, since some nucleation materials undergo further subdivision during fabrication of the plastic composition. In practice, nucleators passing an 80 mesh screen (US Standard Sieve Series), less than about 175 microns, are suitable for most applications. Particles on the order of 5 microns or smaller up to about 800 microns can be used.

The added nucleation agents are incorporated into the isotactic polystyrene by mixing means. Finely divided nucleator and finely divided isotactic polystyrene can be mechanically admixed, but better results are usually obtained by fluidizing the isotactic polystyrene; e.g., dissolving the isotactic polystyrene in a liquid solvent, adding the finely divided nucleator to the isotactic polystyrene solution, and evaporating the solvent from an intimate mixture of polymer and nucleator. The preferred procedure is to thoroughly admix the finely divided nucleating agent with the isotactic polystyrene in heat plastified or melted condition.

The advantages of the present invention are obtained when a composition comprising in intimate admixture a thermoplastic, isotactic polystyrene and an effective proportionate amount of a nucleation agent as described, at a temperature above the crystalline melting point of the isotactic polystyrene but below the decomposition temperature of the ingredients of the mixture, is cooled to a temperature below the crystalline melting point of the isotactic polystyrene. The absolute temperatures are not critical provided the relative temperatures are respected in consideration of the particular isotactic polystyrene and nucleating agent employed, and, in turn, the nucleating agent must be selected in consideration of the temperatures necessary to put the particular isotactic polystyrene in molten condition; that is, the particular nucleation agent used must be thermally stable above the isotactic polystyrene melting point, and the nucleator must exist at least in part in a sterically regular configuration when the temperature of the composition is cooled below the crystalline melting point of the isotactic polystyrene.

It is within the ordinary skill of the art to select the optimum rate of cooling of the nucleated isotactic polystyrene composition from a temperature above the crystalline melting point of the isotactic polystyrene to temperatures below such point in consideration of the particular kind of polystyrene and kind and proportion of nucleating agent present in the composition and the crystalline structure desired in the isotactic polystyrene product. Usually a temperature of 175° C. is satisfactory for crystallization of most isotactic polystyrene. Nucleated compositions in accordance with this invention crystallize at higher rates (from more centers of nucleation) than do otherwise similar compositions absent the added nucleation agent. However, with slow crystallizing isotactic polystyrene, an ultra-fast cooling rate may mask or diminish the benefits of this invention in some instances.

For the fabrication of useful articles, the nucleated composition is made up at a temperature above the crystalline melting point of the isotactic polystyrene but below the decomposition point of any of the ingredients of the composition, as before described, or is reheated to such temperature, and while in heat plastified condition, is fabricated into useful or potentially useful shapes such as fibers, filaments, films, sheets, rods, tubes or other extruded articles, or is molded by compression or injection or otherwise into molded articles and subsequently cooled to set up the shape and induce crystallization. In a particular embodiment, a heat plastified nucleated isotactic polystyrene composition as herein described is melt extruded through a long narrow slit die into a film which is carried over cooling rolls or through cooling baths of liquid or gas for controlled temperature conditioning until crystallization has occurred, then cooled to room temperature and taken to storage. In another particular embodiment, a heat plastified nucleated isotactic polystyrene composition of the kind herein described is pressed by compression or injection into a mold space and cooled at a predetermined rate in the mold until the mass is set up and at least partially crystallized after which the mold is opened and the molded article ejected. An isotactic polystyrene which has been molded and a sufficient degree of crystallization introduced therein to give a heat distortion temperature above about 140° C. can then be removed from the mold and subsequently annealed by exposure to a suitable heat source, beneficially such as a circulating air oven. The optimum temperature for crystallization of isotactic polystyrene is 175° C. However, crystallization beneficially is promoted by heating within the range of 125° C. to 190° C. Isotactic polystyrene containing a relatively small amount of crystallinity, such as about 10 percent, is annealed at the lower end of the temperature range, while those containing higher crystallinity (such as about 25 percent) are annealed at the upper portion of the temperature range. The time necessary to achieve a significant level of crystallinity at this temperature usually varies from about one hour to over 24 hours, depending upon factors such as the polymer thermal and physical history, its molecular weight and molecular weight distribution, and the amount of atactic polymer that is present. However, when the nucleating agents described in Table I are present in the polymer, the overall crystallization time is greatly reduced. Crystallization times on the order of several minutes are obtained. The additional incorporation of suitable plasticizers, the use of optimum polymer molecular weight and the use of physical orientation such as is encountered in fiber forming and injection molding processes often further reduce the overall crystallization time.

Plasticizers useful with isotactic polystyrene generally are employed with benefit in the practice of the present invention. Many of the commonly employed plasticizers do not greatly alter the crystallization rate of the amorphous isotactic polystyrene. However, the optimum temperature for maximum rate of crystallization is occasionally reduced. It has been observed that there appears to be an unexpected synergestic effect when nucleating agents such as are set forth in Table I and some common plasticizers are employed. Significantly greater crystallization rates are achieved in the presence of some plasticizers than when the nucleating agent is employed as the sole additive to the isotactic polystyrene. Any suitable plasticizers must not be chemically reactive with the nucleating agent under conditions of processing or nucleation otherwise the nucleating agent is removed from the system and is inactive or ineffective in promoting crystallization.

Generally plasticizers are employed in a proportion of from about one half weight percent to about 25 weight percent of the total composition, and most advantageously in the range of from about 5 to 10 weight percent, based on the weight of the polystyrene employed. The most effective plasticizers for the promotion of rapid crystallization include butyl stearate, white mineral oil and diisobutyladipate. Also effective as synergestic plasticizers are dibutylsebacate, 1-chloronaphthalene and dioctylphthalate.

In the following experiments all thermal measurements was made on a Perkin Elmer differential scanning calorimeter Model DSC-1. The experimental procedure employed consisted of depositing a small amount of polymer in an aluminum sample pan; the pan and polymer were heated until the polymer melted. A small amount of the nucleating agent was dusted onto the polymer surface and more polymer was added until about 20 to 30 milligrams of polymer had been added to the aluminum sample pan. The amounts of polymer and nucleating agent were determined gravimetrically. An aluminum lid was crimped onto the sample pan and the pan and contents held at a temperature of 540° K in the differential scanning calorimeter for a period of five minutes. The resultant molten sample was quenched on dry ice (solid carbon dioxide) for a period of one minute and subsequently annealed in a circulating air oven while supported on an aluminum block at a temperature of 175° C. for a predetermined period of time (see footnotes (a), (b) and (c) of Table II). The sample was replaced in the calorimeter and the melting behavior obtained at a sensitivity of 4 millicalories per second at a scanning speed of 20° C. per minute. The output of the calorimeter was recorded on a strip chart travelling at a speed of 1½ inches per minute to provide a recorded thermogram. The endothermic area of the thermogram was obtained with a planimeter and the heat of fusion obtained therefrom. The calorimeter was calibrated periodically with reagent grade metallic tin. The heat of fusion was calculated and expressed in calories per gram. The greater the heat of fusion ($\Delta H_f$) the higher the crystallinity and the greater the nucleating effect. Various compounds suitable as nucleators in the present invention are set forth in Table I. In the following examples isotactic polystyrene is prepared by commonly employed methods using Ziegler catalysts such as triethylaluminum with aluminum modified titanium trichloride in hexane using temperatures ranging from about 85° C. to 130° C. and polymerization times ranging from 1 to 6 hours in a stirred reactor. The polymer recovered contains from about 10 to 30 percent atactic polystyrene, the remainder being isotactic polystyrene. The products generally have a molecular weight in excess of two million. Lower molecular weight products are obtained from the higher molecular weight polymers by the application of heat to induce at least partial depolymerization. The compounds of Table I successfully nucleate the crystallization of polystyrene containing up to about 75 weight percent atactic polystyrene, the remainder being isotactic polystyrene. Generally for most applications it is preferred that the polystyrene contain less than 40 weight percent atactic polymer. Isotactic polystyrene having an average molecular weight as low as about 50,000 molecular weight units is useful in the practice of the present invention. However, it is preferred that for most applications the molecular weight be at least 100,000 molecular weight units. In the following examples the molecular weight of polymers is obtained by measuring the reduced viscosities of solutions of 100 milligrams of polymer in 100 milliliters of o-dichlorobenzene at 30° C. The intrinsic viscosities are obtained from the relationship $n = [n] + 0.39c\,[n]^2$ where $n$ is the reduced viscosity; $[n]$ is the intrinsic viscosity, and $c$ is the concentration in grams per deciliter. The equations set forth by W. R. Krigbaum, D. K. Carpenter and S. Newman (J. Phys. Chem., 62, 1586 –92 [1958]) are used to calculate the molecular weight from the intrinsic viscosity.

EXAMPLE 1

Employing the foregoing procedure with the compounds of Table I and the three isotactic polystyrenes (a), (b) and (c), the following results are obtained and tabulated in Table II below.

TABLE II

| COMPOUND | $\Delta H_f$ Calories per Gram | | |
|---|---|---|---|
| | (a) | (b) | (c) |
| (1) | 4.3 | 3.2 | 4.6 |
| (2) | 4.6 | <1.0 | 3.7 |
| (3) | 4.1 | 4.4$^d$ | 2.2 |
| (4) | 4.1 | 4.6 | 4.5 |
| (5) | 4.0 | 3.5 | 4.5 |
| (6) | 5.1 | <1.5$^f$ | 1.9$^f$ |
| (7) | 4.2 | 4.5 | 4.1 |
| (8) | 5.3 | 1.8 | <3.1$^g$ |
| (9) | 4.0 | 1.3 | 2.6 |
| (10) | 4.2 | 3.0 | 4.1 |
| (11) | 4.6 | 3.4 | 4.5 |
| (12) | 5.0 | 0.8 | 2.1$^f$ |
| (13) | 4.5 | 3.5 | 3.0 |
| (14) | 4.3 | 1.4 | 3.6 |
| (15) | 3.5 | 4.1 | 3.9 |
| (16) | 3.6 | 4.3 | 4.5 |
| (17) | 3.0 | 4.3 | 2.4 |
| (18) | 3.7 | 2.1 | 2.4 |
| (19) | 3.9 | 2.1 | 4.2 |
| (20) | 3.3 | 2.0 | 3.1 |
| (21) | 3.4 | 4.5 | 4.2 |
| (22) | 3.1 | 1.0 | 1.9 |
| (23) | 3.0 | 0.9 | 1.0 |
| (24) | 3.3 | <0.2 | <0.2 |
| (25) | 3.2 | <0.2 | 0.7 |
| (26) | 3.2 | 1.5 | 1.0 |
| (27) | 3.2 | 2.2 | 1.4 |
| (28) | 3.5 | 0.6 | 2.1 |
| (29) | 3.0 | 3.2 | 0.9 |
| (30) | 3.4 | 3.4$^e$ | 1.0 |
| (31) | 3.1 | 1.1 | 1.6 |
| (32) | 3.7 | <0.2 | 3.1 |
| (33) | 3.8 | <0.2 | <0.3 |
| (34) | 3.2 | 0.8 | <1.4 |
| (35) | 3.8 | <0.2 | 0.9 |
| (36) | 3.6 | 0.9 | 1.8 |
| (37) | 3.4 | 1.7 | 1.2 |
| (38) | 3.6 | <0.2 | 1.9 |
| (39) | 3.2 | 2.0 | 1.2 |
| (40) | 3.2 | — | — |
| (41) | 3.3 | <0.2 | 4.8 |
| (42) | 3.1 | 0.7 | 0.4 |
| (43) | 3.6 | <0.2 | 2.6 |
| (44) | 2.7 | <0.2 | 0.2 |
| (45) | 2.6 | — | — |
| (46) | 2.7 | — | — |
| (47) | 2.5 | — | — |
| (48) | 2.6 | — | — |
| (49) | 2.7 | — | — |
| (50) | 2.5 | — | — |
| (51) | 2.8 | — | — |
| (52) | 2.5 | — | — |
| (53) | 2.8 | — | — |

TABLE II-continued

| COMPOUND | ΔH$_f$ Calories per Gram | | |
|---|---|---|---|
| | (a) | (b) | (c) |
| (54) | 2.9 | — | — |

(a) 3-5 percent in >2.6 × 10⁶ mol. weight polymer (containing 19.9 percent atactic polystyrene), annealed at 175° C. for 30 minutes. Control, 0.05 calories per gram; maximum >5.5 calories per gram.
(b) 1.0 percent in 6.40 × 10⁵ mol. weight polymer (containing 23.2 percent atactic polystyrene), annealed at 175° C. for 10 minutes. Control, 0.4 calories per gram; maximum, 4.2 calories per gram. Values are average of two determinations.
(c) 1.0 percent in 3.71 × 10⁵ mol. weight polymer (containing 29.5 percent atactic polystyrene), annealed at 175° C. for 10 minutes. Control, 0.0 calories per gram; maximum, 5.4 calories per gram. Values are average of two determinations.
$^d$one determination
$^e$three determinations
$^f$four determinations
$^g$five determinations. Range <0.2 to 4.7 calories per gram.

EXAMPLE 2

A finely powdered isotactic polystyrene having a molecular weight greater than 2.6 × 10⁶ and containing 19.9 weight percent atactic polymer is blended with one half weight percent thymine (4) and thoroughly blended in a jar rotated on rollers over night. Portions of the blend are heated at 540° K for 3 minutes in the previously described differential scanning calorimeter and rapidly quenched on dry ice. The specimens are then heated at a temperature of 175° C. in an aluminum block in circulating air oven for varying periods of time. For purposes of comparison, similar samples without thymine are similarly treated. The heats of fusion of the various samples are determined on the differential scanning calorimeter as hereinbefore described. The samples containing thymine as nucleating agent crystallize rapidly and cannot be quenched without indication of crystallinity in the sample. A heat of fusion of 1.1 calories per gram is observed in zero time. The linear rate of crystallization as determined calorimetrically is 5.3 calories per gram per hour. Crystallization is complete in about 40 to 50 minutes. The specimens without thymine treated in a similar manner exhibit a long induction period ranging from about 5 to 7 hours prior to crystallization and show a linear rate of crystallization of 0.27 calorie per gram per hour and complete crystallization is not obtained until after 25 hours.

EXAMPLE 3

Powdered polystyrene as described in Example 2 is admixed with one half weight percent melamine (1), based on the polystyrene, by blending in a container supported on mechanical rollers for a period of 4 hours. Annealed specimens of the mixture are prepared as described in Example 2 and evaluated on a differential scanning calorimeter. No crystallization induction period is observed. The linear rate of crystallization is 6.5 calories per gram per hour, and crystallization is complete in slightly over 60 minutes. The one half weight percent melamine induced crystallization over 24 times faster than the non-nucleated control.

EXAMPLE 4

Isotactic polystyrene having a molecular weight of 6.4 × 10⁵ and containing 23.2 percent atactic polystyrene is admixed with 0.25 weight percent thymine (4) and 5 weight percent butyl stearate. The mixture is placed on a microscope slide and heated to a temperature of about 270° C. for one minute and then rapidly cooled to room temperature. The sample is re-heated to a temperature of 160° C. for a period of 5 minutes. A portion of the polymer without thymine or butyl stearate is similarly treated and heated on a microscope slide to a temperature range between 275° C. and 280° C. for one minute, rapidly chilled to room temperature and re-heated at 175° C. for 169 minutes. The samples are then examined between crossed polarizers in a light microscope at a magnification of 500 diameters employing an objective lens having a numerical aperture of 0.65. The nucleated plasticized specimen appears to have a similar amount of crystallinity, is uniformly birefringent and has crystalline units too small for resolution in the microscope. By contrast, the non-nucleated specimen shows large birefringent spherulites about 33 microns in diameter.

EXAMPLE 5

A powdered isotactic polystyrene having a molecular weight of 3.71 × 10⁵ and containing 29.5 weight percent atactic polystyrene is mixed with 0.05 weight percent oxamide (11) at room temperature. The mixture is subsequently heated to a temperature of 267° C. for several minutes and is quickly quenched in dry ice. The sample is then heated to a temperature of 175° C. for a period of 10 minutes. The annealed sample is highly crystalline, and, employing the previously described differential scanning calorimeter, has a heat of fusion of 4.2 calories per gram. By way of comparison, a similar sample without the addition of oxamide requires 110 minutes annealing to show the same heat of fusion. A heat of fusion of 4.2 calories per gram represents about 81 percent of the maximum amount of crystallinity which can be obtained by long term annealing.

EXAMPLE 6

A powdered isotactic polystyrene having a molecular weight of 6.40 × 10⁵ and containing 23.2 percent atactic polymer is thoroughly mixed with 0.25 weight percent 4-hydroxy-6,7-dimethylpteridine (16). The mixture is then extruded through a melt indexer in a manner generally similar to that described in ASTM Bulletin 1238-57T employing a temperature of 240° C. with a 0.026 inch diameter orifice and using an average ram weight of 20.5 kilograms. The resultant crystalline polymer has a heat of fusion of 3.8 calories per gram. Annealing of the extruded fiber at 160° C. for 5 minutes results in a polymer having a heat of fusion of 4.0 calories per gram. For purposes of comparison, the foregoing is repeated without the nucleating agent, Compound (16). The heat of fusion of the initially extruded fibers is one calorie per gram and after annealing is 2.3 calories per gram.

EXAMPLE 7

A mixture is prepared employing powdered isotactic polystyrene having a molecular weight in excess of 2.6 × 10⁶ molecular weight units which contains 19.9 weight percent atactic polystyrene. Five weight percent diisobutyl adipate and about 0.5 percent 2-imidazolidinethione (6). The mixture is treated as described in Example 1 and the resulting heat of fusion is calories per gram. The procedure is then repeated with the exception that the diisobutyl adipate is omitted. The resulting heat of fusion is 5.1 calories per gram. Repetition of the foregoing with the exception that Compound (6) is omitted shows no measureable heat of fusion. Similar synergestic effects are obtained when the diisobutyl adipate and Compound (6) are replaced with paraffin oil, plasticizer and Compound (12). The heat of fusion obtained is 7.0 calories per gram. When the paraffin oil is omitted the heat of fusion is 4.8 calories per gram. When the polystyrene is treated using only paraffin oil and without the nucleating agent, no measureable heat of fusion is observed. When the diisobutyl adipate is replaced with butyl stearate employing Compound (6), the heat of fusion is 6.2 calories per gram; buty stearate with the isotactic polystyrene in the absence of Compound (6) gives a value of only 0.8 calorie per gram.

EXAMPLE 8

A plurality of isotactic polystyrene compositions employing Compound (4) from Table I and butyl stearate are evaluated for fiber forming characteristics where the fibers are extruded through a 0.031 inch diameter orifice and are heat treated to induce crystallization under varying conditions. The physical properties are subsequently determined. The results are set forth in Table III which follows.

for comparative purposes only and are the results of portions of similar polymers without the melamine and molded at 480° F.

TABLE IV

| MINUTES AT 175° C. | ULTIMATE TENSILE STRENGTH* | HEAT OF FUSION** |
|---|---|---|
| 0 | 6180 (5920) | 0.6 (0.1) |
| 10 | 4180 (4870) | 2.8 (0.8) |
| 40 | 3860 (2570) | 3.2 (1.8) |
| 60 | 3200 (2210) | 4.0 (2.7) |

*pounds per square inch
**calories per gram

EXAMPLE 10

Isotactic polystyrene in powdered form containing 50.4 percent atactic polymer and having an average molecular weight in excess of $2.6 \times 10^6$ is dry blended

TABLE III

| POLYMER | MOLECULAR WEIGHT $\times 10^5$ | FIBER DIAMETER (mils) | ULTIMATE TENSILE STRENGTH$^a$ * | TENSILE YIELD STRESS$^a$ * | ULTIMATE ELONGATION$^a$ % | TENSILE YIELD STRAIN$^a$ % | FIBER HISTORY |
|---|---|---|---|---|---|---|---|
| Isotactic | 5.38$^b$ | 6.4 | 10,200 | 11,000 | 17 | 3 | as spun at 303° C. and 290–310 psi* |
| Polystyrene | 5.38 | 6.3 | 8,800 | 9,500 | 51 | 2 | annealed at 175° C. for 5 minutes (c) |
| | 5.38 | 6.9 | 7,300 | — | 2 | — | annealed at 175° C. for 16 minutes (c) |
| | 5.38 | 5.6 | 10,900 | — | 2 | — | annealed at 175° C. for 48 minutes (c) |
| | 5.38 | 5.3 | 12,400 | 12,900 | 8 | 5 | drawn 1.6/1 at 103° C. |
| | 5.38 | 5.7 | 15,700 | 12,800 | 24 | 4 | drawn 1.6/1 at 103° C. & then annealed at 175° C. for 15 minutes (c) |
| Isotactic Poly- | 5.54–6.19$^b$ | 5.3 | 10,700 | — | 67 | — | as spun at 327–330° C. & 260–280 psi* |
| styrene, 5% butyl | 5.54–6.19 | 4.0 | 14,300 | 13,200 | 53 | 3 | annealed at 175° C. for 5 minutes (c) |
| stearate, 0.25% | 5.54–6.19 | 4.9 | 12,200 | — | 3 | — | annealed at 175° C. for 16 minutes (c) |
| thymine (4) | 5.54–6.19 | 4.4 | 11,200 | — | 4 | — | annealed at 175° C. for 48 minutes (c) |
| | 5.54–6.19 | 4.5 | 15,900 | — | 48 | — | drawn at 1.5/1 at 83° C. |
| | 5.54–6.19 | 4.6 | 19,100 | 12,900 | 30 | 4 | drawn 1.5/1 at 83° C. & then annealed at 175° C. for 15 minutes (c) |
| Isotactic poly- | 7.31$^b$ | 4.6 | 8,600 | 9,200 | 51 | 3 | as spun at 325–330° C. and 250–260 psi* |
| styrene, 0.26% thymine (4), | 7.31 | 3.5 | 14,400 | 13,900 | 14 | 3 | annealed at 175° C. for 15 minutes (c) |
| 7.3% butyl | 7.31 | 3.6 | 15,800 | 13,500 | 34 | 4 | drawn 1.5/1 at 76–77° C. |
| stearate, 0.2% | 7.31 | 4.1 | 13,100 | 10,200 | 55 | 5 | drawn 1.4/1 at 76–77° C. |
| Ionol | 7.31 | 3.7 | 14,300 | 12,700 | 27 | 4 | drawn 1.5/1 at 76–77° C. |
| | 7.31 | 4.1 | 17,700 | 13,900 | 20 | 3 | drawn 1.5/1 at 76–77° C. and then annealed at 175° C. for 15 minutes (c) |

$^a$average of 5 fibers
$^b$original molecular weight $>2.56 \times 10^6$
$^c$annealed while restrained on 1¼ inch diameter thin wall aluminum tube
*pounds per square inch

EXAMPLE 9

Powdered isotactic polystyrene having a molecular weight in excess of $2.6 \times 10^6$ molcular weight units and containing 19.9 percent atactic polystyrene is admixed with 0.25 weight percent melamine (1). The resultant mixture is heated at a temperature of 540° F. for 5 minutes in a compression mold designed to mold one-eigth inch thick specimens. Initial 5 minute heating is done without applying significant pressure to the powdered mixture. An additional 5 minutes in the mold under a pressure of 20,000 pounds provides moldings which are quenched in ice water and subsequently annealed at a temperature of 175° C. in a circulating air oven for varying times. The ultimate tensile strength and heat of fusion for the specimens prepared are shown in Table IV which follows. The values shown in parenthesis are for 16 hours with 0.25 weight percent thymine (4) and 5 weight percent butyl stearate. A portion of the resultant mixture is pressed between two microscope cover glasses at a temperature of about 275 to 280° C. for one minute and rapidly cooled to room temperature by placing the specimen on an aluminum block. Specimens are also treated in a similar manner which consist only of the powdered polymer and powdered polymer containing 5 weight percent butyl stearate. Microscopic examination of the slides between crossed polarizers at a magnification of 125 diameters shows no birefringent crystalline species to be present. The three samples are heated to 175° C. for 5 minutes in a circulating air oven. The sample containing thymine turns white and under the microscope appears as a mass of very small birefringent spherulites. The remaining samples are clear and colorless. No crystalline species are observed in the pure polymer and a few small spherulites are present in the sample containing butyl stearate.

Isotactic polystyrene polymers employing nucleators in accordance with the present invention are readily compression and/or injection molded to provide shaped articles which rapidly crystallize to provide articles of desirable physical properties.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto-appended claims.

What is claimed is:

1. A readily crystallizable isotactic polystyrene composition, the composition comprising in intimate admixture from about 99.995 to about 95 parts by weight of isotactic polystyrene and from about 0.005 to about 5 parts by weight of melamine.

2. A readily crystallizable isotactic polystyrene composition, the composition consisting of, in intimate admixture from about 99.995 to about 95 parts by weight of isotactic polystyrene and from about 0.005 to about 5 parts by weight of melamine.

3. A readily crystallizable isotactic polystyrene composition, the composition consisting essentially of, in intimate admixture from about 99.995 to about 95 parts by weight of isotactic polystyrene and from about 0.005 to about 5 parts by weight of melamine.

* * * * *